United States Patent [19]

Borden

[11] Patent Number: 4,529,837

[45] Date of Patent: Jul. 16, 1985

[54] MULTISTRAND SUPERCONDUCTOR CABLE

[75] Inventor: Albert R. Borden, El Cerrito, Calif.

[73] Assignee: The United States of America as represented by the United States Department of Energy, Washington, D.C.

[21] Appl. No.: 587,438

[22] Filed: Mar. 8, 1984

[51] Int. Cl.³ .......................................... H01B 12/00
[52] U.S. Cl. .............................. 174/128 S; 29/599; 57/215; 57/219; 156/50; 174/129 R; 174/133 R
[58] Field of Search ............ 174/126 R, 126 S, 128 R, 174/128 S, 129 R, 133 R; 156/50; 29/599; 57/215, 219; 428/397, 399

[56] References Cited

U.S. PATENT DOCUMENTS

| | | | |
|---|---|---|---|
| 2,609,653 | 9/1952 | Peterson | 174/128 R |
| 3,699,647 | 10/1972 | Bidault et al. | 174/128 S X |
| 3,829,964 | 8/1974 | Critchlow et al. | 29/599 |
| 4,329,539 | 5/1982 | Tanaka et al. | 174/128 S |
| 4,439,256 | 3/1984 | Meserve | 174/129 R X |

FOREIGN PATENT DOCUMENTS

| | | | |
|---|---|---|---|
| 20575 | 2/1978 | Japan | 156/50 |
| 89696 | 8/1978 | Japan | 29/599 |

OTHER PUBLICATIONS

Borden, R. C. et al; Mechanically Improved Rectangular Cable; Lawrence Berkeley Laboratory, Mar. 1983.

Primary Examiner—A. T. Grimley
Assistant Examiner—Morris H. Nimmo
Attorney, Agent, or Firm—L. E. Carnahan; Roger S. Gaither; Judson R. Hightower

[57] ABSTRACT

Improved multistrand Rutherford-type superconductor cable is produced by using strands which are preformed, prior to being wound into the cable, so that each strand has a variable cross section, with successive portions having a substantially round cross section, a transitional oval cross section, a rectangular cross section, a transitional oval cross section, a round cross section and so forth, in repetitive cycles along the length of the strand. The cable is wound and flattened so that the portions of rectangular cross section extend across the two flat sides of the cable at the strand angle. The portions of round cross section are bent at the edges of the flattened cable, so as to extend between the two flat sides. The rectangular portions of the strands slide easily over one another, so as to facilitate flexing and bending of the cable, while also minimizing the possibility of causing damage to the strands by such flexing or bending. Moreover, the improved cable substantially maintains its compactness and cross-sectional shape when the cable is flexed or bent.

7 Claims, 9 Drawing Figures

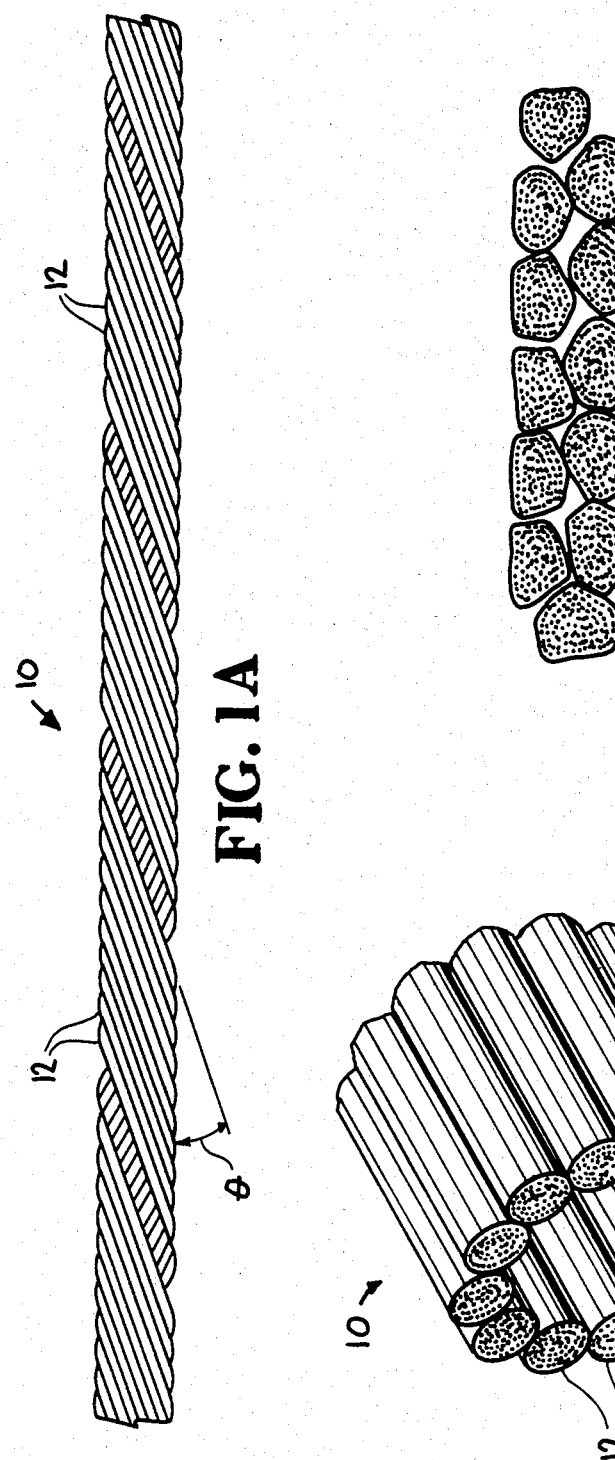
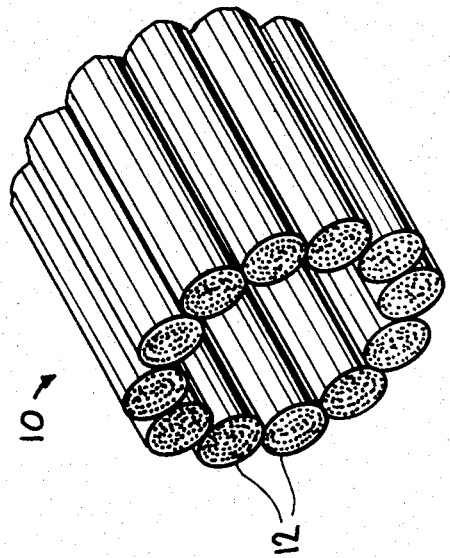
FIG. 1A
FIG. 1B
FIG. 1C

MULTISTRAND SUPERCONDUCTOR CABLE

MULTISTRAND SUPERCONDUCTOR CABLE

The Unites States Government has rights in this invention pursuant to Contract No. DE-AC03-76SF00098 between the U.S. Department of Energy and the University of California.

FIELD OF THE INVENTION

This invention relates to a new and improved multistrand superconductor cable of the Rutherford type, in which a plurality of strands are helically wound to form a hollow cable which is then flattened to form a multistrand ribbon.

BACKGROUND OF THE INVENTION

Superconducting magnet coils have been wound with multistrand Rutherford-type cable for many years, and the advantages of such cable are well known. Rutherford-type cable was named after the Rutherford Laboratory in England which first produced such cable.

Rutherford-type cable is made by winding or twisting a plurality of superconductor strands around an elongated mandrel to form a semifinished generally cylindrical cable having a hollow core. Pressure rollers are then employed to flatten the hollow core cable into a flat multistrand ribbon having two generally flat sides and two edges.

The general practice has been to employ strands made of superconductor wire which is substantially round in cross section. The wire generally comprises superconductor material which is copper-clad, or clad with some other soft metal, to protect the superconductor material and to provide current carrying stability.

When the helically wound cable is flattened by the pressure rollers, the round external surfaces of the strands are flattened to a considerable extent. The pressure rollers cause the finished ribbon cable to have a compact cross section of known density.

However, the pressure rollers do not flatten the round interior surfaces of the strands to any substantial extent. Instead, the action of the pressure rollers produces an irregular indentation or embedment of the strands of one layer into the strands of the other layer at each point where each initially round strand crosses another round strand in the other layer of the cable. This indentation of the round strands in the core of the flattened cable produces interlocking knobs or knuckles which resist flexing or bending of the finished ribbon cable. This resistance to flexing may be called the knuckle effect. Any flexing or bending of the cable, or any change in tension, forces the internal knuckles out of register and results in irregular internal stresses between the knuckles within the cable. Thus, any flexing produces a low and irregular compressive group modulus across the thickness of the cable. Any flexing or movement of the strands along the edges of the cable produces an increase in the thickness at the point where each strand curves back to the other side of the cable. The result is to produce a cross section of a "dog bone" shape. This shape tends to create difficulties with the insulation required between turns and also results in a wound dipole magnet coil having ends which are not mechanically rigid.

When the cable is flexed or bent, the localized stresses between the knuckles may cause localized damage to the strands which tends to reduce the current carrying capacity of the cable, in that the damaged cable tends to lose super-conductivity and to revert into normal resistive conductivity at a lower current, than in the case of a cable which has not been damaged.

SUMMARY OF THE INVENTION

One object of the present invention is to eliminate the knuckle effect caused by the indentation of the interior surfaces of the crossing strands.

Another object is to minimize the "dog bone" shape of the edges when the flattened cable is wound in a small radius, in a direction perpendicular to the flat dimension of the cable.

A further object is to minimize the distortion in the width of the flat cable when it is flexed around the "hard way", normal to the edge of the cable.

Another object is to reduce most of the sponginess of keystoned cable, which is a cable having a cross section shaped like a rectangle or trapezoid.

A further object is to produce rounded corners in a cable having a keystone-shaped cross section.

Another object is to reduce the mechanical degradation of internal superconductor filaments, due to flexing or bending of the cable. This is especially important in low-copper ratio conductors and in the new react-in-place niobium-tin alloys now being developed.

A further object is to reduce the possibility of localized damage to the strands of the cable, due to flexing or bending, and thereby to minimize the possibility of reducing the current capacity of the cable, which may cause the cable to lose superconductivity and to revert into normal resistive conductivity, even when the critical magnetic field or the critical current is not exceeded.

These and other objects of the present invention may be achieved by producing a multistrand Rutherford-type superconductor cable by using strands which are preformed, prior to being wound into the cable, so that each strand has a variable cross section, with successive portions having a substantially round cross section, a transitional oval cross section, a rectangular cross section, a transitional oval cross section, a round cross section and so forth, in repetitive cycles along the length of the strand. The cable is wound and flattened so that the portions of rectangular cross section extend across the two flat sides of the cable at the strand angle. The portions of round cross section are bent at the edges of the flattened cable, so as to extend between the two flat sides.

The rectangular portions of the strands slide easily over one another when the flattened cable is flexed or bent, so as to facilitate flexing and bending of the cable, while also minimizing the possibility of causing damage to the strands by such flexing or bending. Moreover, the improved cable substantially maintains its compactness and its cross-sectional shape when the cable is flexed or bent.

The variable cross section may be produced by a special roller die, or by any other suitable means.

BRIEF DESCRIPTION OF THE DRAWINGS

Further objects, advantages and features of the present invention will appear from the following description, taken with the accompanying drawings, in which:

FIG. 1a is a view of a section of a multistrand superconductor cable made in accordance with the present invention, with two strands omitted for clarity.

FIGS. 1b and 1c illustrate the cross-sections of the FIG. 1 cable before and after flattening.

FIGS. 3, 4, 5 and 6 are enlarged diagrammatic sectional views, taken generally along the lines 3—3, 4—4, 5—5, and 6—6 in FIG. 2a, with the cross-sections being shown as solid wire for simplification of illustration.

DETAILED DESCRIPTION OF ILLUSTRATIVE EMBODIMENT

FIGS. 1-6 illustrate a superconductor cable 10 to be described as an illustrative embodiment of the present invention. The cable 10 is of the Rutherford type, comprising a plurality of superconductor strands 12 made of wire which generally comprises copper-clad filaments of any known or suitable superconductor material.

As in the usual Rutherford-type construction, the strands 12 are helically wound or twisted to form a hollow-core, generally cylindrical cable, as shown in FIG. 1b, which is then flattened, to form a flat multistrand ribbon, as illustrated by the cable 10 in FIGS. 1a and 1c. The cable 10 may be flattened and compacted by pressure rollers which engage both the flat sides and the edges of the cable 10.

Figure 2A:
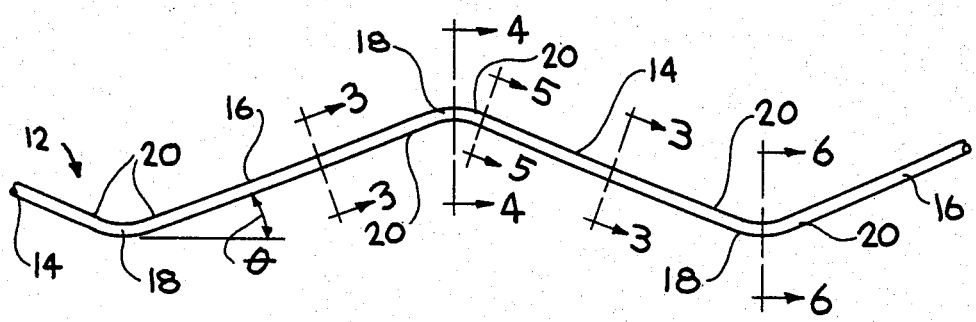
FIG. 2a is a diagrammatic plan view showing one of the strands employed in the multistrand cable of FIG. 1.

The cable 10 may comprise quite a number of separate superconductor strands 12, such as twelve such strands, which extend across the flat sides of the cable 10 at a strand angle $\theta$, as shown in FIGS. 1a and 2a. The strand angle depends upon the number of strands and the dimensions of the strands and the cable.

The flattened cable 10 has two substantially flat layers. Two of the strands 12 of cable 10 are removed to illustrate the two layer construction of the cable, as shown in FIG. 1a that all of these strands 12 extend in both layers.

Figure 2B:
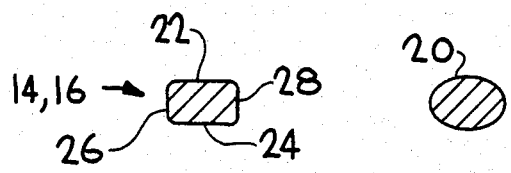
FIG. 2b is an enlarged cross-section of the FIG. 2a strand illustrating the composition thereof.
Figure 2B:
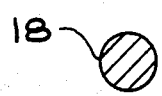
Figure 2B:
Figure 2B:
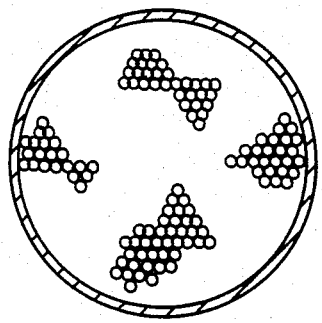

FIG. 2a shows one of the strands 12 separately and FIG. 2b shows an enlarged cross-section of the strand which illustrates that the strand 12 is composed of a plurality of filaments within a cladding, as known in the superconductor art. It will be understood that all of the strands 12 have the appearance shown in FIG. 2a. The strand 12 of FIG. 2a has substantially straight portions 14 which extend across the flat upper layer and substantially straight portions 16 which extend across the lower layer, shown in FIG. 1a. Between the portions 14 and 16, the strand 12 has portions 18 which are bent at the edges of the cable 10, between the upper and lower layers.

In accordance with the present invention, the strands 12 of the cable 10 are pre-formed, before they are wound to produce the cable, so as to have a variable cross section, which varies along the length of each strand. The pre-forming of the strands produces a cable which is more compact and which has improved flexing and bending characteristics.

As shown in FIG. 3, the portions of the strand 12 which become the straight portions 14 and 16 are pre-formed so as to be substantially rectangular in crosssection.

As shown in FIGS. 4 and 6, the portions of the strand 12 which are to become the bent portions 18 are pre-formed so as to be substantially round or circular in cross section.

The strand 12 also has transitional portions 20, between the round portions 18 and the rectangular portions 14 and 16. As shown in FIG. 5, the portions of the strand 12 which are to become the transitional portions 20 are pre-formed so as to be oval or elliptical in cross section.

As pointed out above, the cross-sections of the strand 12 illustrated in FIGS. 3-6 are shown as solid wires for simplicity of illustration, it being understood that the strand 12 is made up of copper-clad filaments, as shown in FIG. 2b.

Thus, along the length of the strand 12, it is pre-formed so as to have successive portions which are round, oval, rectangular and oval in cross section, in a repetitive cycle. The pre-formed strands are wound and flattened so that the round portions become the bent portions 18; the oval portions become the transitional portions 20; and the rectangular portions become the straight portions 14 and 16, extending across the flat sides of the flat cable 10.

The rectangular portions 14 and 16 have the advantage of having flat upper and lower surfaces 22 and 24, so that the flattened cable 10 is highly compact. Moreover, the flat interior surfaces of the rectangular portions 14 and 16 slide easily along one another, so as to improve the flexing and bending characteristics of the cable. The flat surfaces 22 and 24 overcome the "knuckle effect" which has been experienced with conventional Rutherford-type cable, due to the interlocking knobs which tend to be formed on the interior surfaces of the strands, due to the action of the flattening rollers. The easy slidability of the flat surfaces 22 and 24 along one another largely obviates any possibility that the strands 12 will be damaged by the flexing and bending which are necessary to form the flattened cable 10 into magnet coils.

The rectangular portions 14 and 16 also have flat edge surfaces 26 and 28 which enable the adjacent strands 12 in the flattened cable 10 to abut closely together, as the strands extend across the flat sides of the cable 10. Thus, the compactness of the cable 10 is enhanced.

The pre-formed round portions 18 bend easily at the edges of the flattened cable 10 and minimize the possibility of damage to the strands 12 due to such bending. The oval portions 20 represent smooth transitions between the round portions 18 and the rectangular portions 14 and 16.

The strands 12 may be pre-formed in cross section by any suitable means, such as roller dies. The variable cross section of the pre-formed strands 12 has a repetitive cycle along the length of the strands. The length of each cycle may be termed the strand length, which is the length between the section planes 4—4 and 6—6 in FIG. 2a.

With the pre-formed, variable cross section strands 12 of the present invention, the flattened cable 10 tends to remain compact, and without any change in cross sectional shape, when the flattened cable is flexed or bent. Due to the easy slidability of the flat surfaces 22 and 24, the flexing and bending of the cable 10 are facilitated, both as to flatwise bending and edgewise bending of the cable. Moreover, cross sectional current carrying density is increased.

The present invention is primarily applicable to flattened Rutherford-type superconductor cable intended to be used in winding superconductive magnet coils. However, the pre-formed, variable cross section strands of the present invention are also applicable to stranded cables intended for use in motors and generators, in which the cable has normal resistive conductivity, rather than superconductivity. The pre-forming of the strands with portions of rectangular cross section makes it possible to produce cables having enhanced density, resulting in smaller size and greater efficiency.

Various modifications, alternative constructions and equivalents may be employed without departing from the true spirit and scope of the present invention, as defined in the following claims.

What is claimed is:

1. A multistrand superconductor cable, comprising
a plurality of superconductor strands which are helically wound to first form a hollow core semifinished cable which is then flattened to form a cable of multistrand ribbon having two flat sides and two edges,
each strand in said ribbon having substantially straight portions extending at a strand angle along said flat sides of said ribbon and having bent portions at the edges of said ribbon,
each of said strands having a variable cross section which is preformed prior to the winding of said strands,
each strand having successive preformed portions of substantially round cross section, transitional oval cross section, rectangular cross section, transitional oval cross section, round cross section and so forth along the length of the strand,
said portions of rectangular cross section forming said generally straight portions along the flat sides of said ribbon,
said portions of substantially round cross section forming the bent portions at the edges of said ribbon,
whereby the flexing and bending characteristics of said ribbon are improved.

2. A method of making a multistrand superconductor cable, comprising the steps of
preforming the cross section of a plurality of superconductor strands to give each strand a variable cross section along its length,
each strand being preformed to give it successive portions along its length having substantially round cross section, transitional oval cross section, rectangular cross section, transitional oval cross section, round cross section and so forth in a repeating cycle along the length of the strand,
helically winding the strands to form a hollow generally cylindrical semifinished cable,
and flattening the hollow semifinished cable into the form of a ribbon having two flat sides and two edges,
said semifinished cable being flattened in such a manner that the portions of the strands of rectangular cross section extend across the flat sides of the ribbon at a strand angle, while the portions of the strands of round cross section are bent at the edges of said ribbon so as to extend between the flat sides thereof,
whereby the flexing and bending characteristics of said ribbon are improved.

3. A superconductor strand for use in making a multistrand flattened cable having two flat sides and two edges,
said strand having a variable cross section along its length comprising successive portions of substantially round cross section, transitional oval cross section, rectangular cross section, transitional oval cross section, round cross section and so forth in a repeated cycle along the length of the strand,
said portions of rectangular cross section being adapted to extend at a strand angle across the flat sides of the flattened cable,
said portions of round cross section being adapted to be bent at the edges of said flattened cable to extend between the opposite flat sides of the cable.

4. A superconductor strand according to claim 3, in which said strand comprises superconductor material which is copper-clad.

5. A cable according to claim 1, in which each of said strands comprises superconductor material which is copper-clad.

6. A method of making a multistrand electrical cable, comprising the steps of
preforming the cross section of a plurality of conductor strands to give each strand a variable cross section along its length,
each strand being preformed to give it successive portions along its length having substantially round cross section, transitional oval cross section, rectangular cross section, transitional oval cross section, round cross section and so forth in a repetitive cycle along the length of the strand,
helically winding the strands to form a hollow generally cylindrical semifinished cable,
and flattening the hollow semifinished cable into the form of a ribbon having two flat sides and two edges,
said semifinished cable being flattened in such a manner that the portions of the strands of rectangular cross section extend across the flat sides of the ribbon at a strand angle,
while the portions of the strands of round cross section are bent at the edges of said ribbon so as to extend between the flat sides thereof,
whereby the flexing and bending characteristics of the ribbon are improved.

7. A multistrand electrical cable, comprising
a plurality of conductor strands which are helically wound to first form a hollow semifinished cable which is then flattened to form a cable of multistrand ribbon having two flat sides and two edges,
each strand in said ribbon having substantially straight portions extending at a strand angle along said flat sides of said ribbon and having bent portions at the edges of said ribbon,
each of said strands having a variable cross section which is preformed prior to the winding of said strands,
each strand having successive preformed portions of substantially round cross section, transitional oval cross section, rectangular cross section, transitional oval cross section, round cross section and so forth along the length of the strand,
said portions of rectangular cross section forming said generally straight portions along the flat sides of said ribbon,
said portions of substantially round cross section forming the bent portions at the edges of said ribbon,
whereby the flexing and bending characteristics of said ribbon are improved.

* * * * *